(12) United States Patent
Nishioka et al.

(10) Patent No.: US 6,617,590 B2
(45) Date of Patent: Sep. 9, 2003

(54) IMAGE READING APPARATUS

(75) Inventors: Yukinori Nishioka, Kanagawa (JP); Masashi Hakamata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/815,278

(22) Filed: Mar. 23, 2001

(65) Prior Publication Data

US 2001/0054701 A1 Dec. 27, 2001

(30) Foreign Application Priority Data

Mar. 23, 2000 (JP) ........................................ 2000-081556

(51) Int. Cl.[7] ............................................. G01N 21/64
(52) U.S. Cl. ................................. 250/459.1; 250/458.1; 250/229
(58) Field of Search ................................. 250/584, 585, 250/586, 587, 591, 458.1, 459.1, 461.1, 461.2, 229

(56) References Cited

U.S. PATENT DOCUMENTS 5,260,578 A * 11/1993 Blinton et al. ........... 250/461.1
6,110,426 A * 8/2000 Shalon et al. ............. 422/68.1
6,300,639 B1 * 10/2001 Wiederhoeft ............. 250/458.1

\* cited by examiner

*Primary Examiner*—Constantine Hannaher
*Assistant Examiner*—Timothy Moran
(74) *Attorney, Agent, or Firm*—Sughrue Mion, PLLC

(57) ABSTRACT

An image reading apparatus includes three laser stimulating ray sources, a stage on which two or more kinds of image carriers can selectively be placed, a scanning mechanism for scanning the image carrier with a laser beam emitted from the laser stimulating ray sources, thereby stimulating the image carrier, a light detector for photoelectrically detecting light emitted from the image carrier in response to stimulation by the laser beam and a confocal optical system for leading light emitted from the image carrier to the light detector, the image reading apparatus further including a confocal switching member having pinholes of different diameters and disposed between the confocal optical system and the light detector. The thus constituted image reading apparatus can be used for not only a micro-array image detecting system but also an autoradiographic image detecting system, a chemiluminescent image detecting system, an image detecting system using an electron microscope and a radiographic diffraction image detecting system using a stimulable phosphor sheet and a fluorescent image detecting system.

26 Claims, 6 Drawing Sheets

32a  32b  32c

IMAGE READING APPARATUS

BACKGROUND OF THE INVENTION

The present invention relates to an image reading apparatus and, particularly, to such an apparatus which can be used for not only a micro-array image detecting system but also an autoradiographic image detecting system, a chemiluminescenct image detecting system, an electron microscopic image detecting system and a radiographic diffraction image detecting system using a stimulable phosphor sheet, and a fluorescent image detecting system.

DESCRIPTION OF THE PRIOR ART

An autoradiographic image detecting system is known that uses as a detecting material for detecting radiation a stimulable phosphor which can absorb, store and record the energy of radiation when it is irradiated with radiation and which, when it is then stimulated by an electromagnetic wave having a specified wavelength, can release a stimulated emission whose light amount corresponds to the amount of radiation with which it was irradiated. A method associated with this detecting system comprises the steps of: introducing a radioactively labeled substance into an organism, using the organism or a part of the tissue of the organism as a specimen, placing the specimen and a stimulable phosphor sheet formed with a stimulable phosphor layer together in layers for a certain period of time, storing and recording radiation energy in a stimulable phosphor contained in the stimulable phosphor layer, scanning the stimulable phosphor layer with an electromagnetic wave to excite the stimulable phosphor, photoelectrically detecting the stimulated emission released from the stimulable phosphor to produce digital image signals, effecting image processing on the obtained digital image signals, and reproducing an image on a displaying means such as a CRT or the like or a photographic film (see, for example, Japanese Patent Publication No. 1-60784, Japanese Patent Publication No. 1-60782, Japanese Patent Publication No. 4-3952 and the like).

There is also known a chemiluminescent image detecting system using as a detecting material for detecting light a stimulable phosphor which can absorb, store and record the light energy when it is irradiated with light and which, when it is then stimulated by an electromagnetic wave having a specified wavelength, can release stimulated emission whose light amount corresponds to the amount of light radiation with which it was irradiated. A method associated with the chemiluminescent image detecting system comprises the steps of: selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, photoelectrically detecting the chemiluminescent emission in the wavelength of visible light generated by the contact of the chemiluminescent substance and the labeling substance and producing digital image signals, effecting image processing thereon, and reproducing a chemiluminescent image on a display means such as a CRT or a recording material such as a photographic film, thereby obtaining information relating to the high molecular substance such as genetic information (see, for example, U.S. Pat. No. 5,028,793, British Patent Publication GB No. 2,246,197A and the like).

There are further known an electron microscopic image detecting system and a radiographic diffraction image detecting system. A method of using these two systems comprises the steps of: employing, as a detecting material for an electron beam or radiation, a stimulable phosphor which can absorb and store the energy of an electron beam or radiation upon being irradiated therewith and release a stimulated emission whose amount is proportional to that of the received electron beam or radiation upon being stimulated with an electromagnetic wave having a specific wavelength range, irradiating a metal or nonmetal specimen with an electron beam and effecting elemental analysis, composition analysis or structural analysis of the specimen by detecting a diffraction image or a transmission image, or irradiating the tissue of an organism with an electron beam and detecting an image of the tissue of the organism, or irradiating a specimen with radiation, detecting a radiographic diffraction image and effecting structural analysis of the specimen (see, for example, Japanese Patent Application Laid Open No. 61-51738, Japanese Patent Application Laid Open No. 61-93538, Japanese Patent Application Laid Open No. 59-15843 and the like).

Unlike the system using a photographic film, according to these systems using the stimulable phosphor as a detecting material for an image, development, which is chemical processing, becomes unnecessary. Further, it is possible to reproduce a desired image by effecting image processing on the obtained image data and effect quantitative analysis using a computer. Use of a stimulable phosphor in these processes is therefore advantageous.

On the other hand, a fluorescence system using a fluorescent substance as a labeling substance instead of a radioactively labeling substance in the autoradiographic image detecting system is known. According to this system, it is possible to study a genetic sequence, study the expression level of a gene, and to effect separation or identification of protein or estimation of the molecular weight or properties of protein or the like. For example, this system can perform a process including the steps of distributing a plurality of DNA fragments on a gel support by means of electrophoresis after a fluorescent dye was added to a solution containing a plurality of DNA fragments to be distributed, or distributing a plurality of DNA fragments on a gel support containing a fluorescent dye, or dipping a gel support on which a plurality of DNA fragments have been distributed by means of electrophoresis in a solution containing a fluorescent dye, thereby labeling the electrophoresed DNA fragments, exciting the fluorescent dye by a stimulating ray to cause it to release fluorescent light, detecting the released fluorescent light to produce an image and detecting the distribution of the DNA fragments on the gel support. This system can also perform a process including the steps of distributing a plurality of DNA fragments on a gel support by means of electrophoresis, denaturing the DNA fragments, transferring at least a part of the denatured DNA fragments onto a transfer support such as a nitrocellulose support by the Southern-blotting method, hybridizing a probe prepared by labeling target DNA and DNA or RNA complementary thereto with the denatured DNA fragments, thereby selectively labeling only the DNA fragments complementary to the probe DNA or probe RNA, exciting the fluorescent dye by a stimulating ray to cause it to release fluorescent light, detecting the released fluorescent light to produce an image and detecting the distribution of the target DNA on the transfer support. This system can further perform a process including the steps of preparing a DNA probe complementary to DNA containing a target gene labeled by a labeling substance, hybridizing it with DNA on a transfer support, combining an enzyme with the complementary DNA labeled by a labeling substance, causing the enzyme to contact a fluorescent substance, transforming the fluorescent substance to a fluorescent substance having fluorescent light releasing property, exciting the thus produced fluorescent substance by a stimulating ray to release fluorescent light, detecting the fluorescent light to produce an image and detecting the distribution of the target DNA on the transfer support. This fluorescence detecting system is advantageous in that a genetic sequence or the like can be easily detected without using a radioactive substance.

Further, a micro-array image detecting system has been recently developed, which comprises the steps of using a spotter device to drop at different positions on the surface of a carrier such as a slide glass plate, a membrane filter or the like a specific binding substance, which can specifically bind with a substance derived from a living body such as hormone, a tumor marker, enzyme, antibody, antigen, abzyme, other proteins, a nuclear acid, cDNA, DNA, RNA and the like and whose sequence, base length, composition and the like are known, thereby forming a number of independent spots, hybridizing the specific binding substance with a substance derived from a living body such as hormone, a tumor marker, enzyme, antibody, antigen, abzyme, other proteins, a nuclear acid, cDNA, DNA or mRNA, which is gathered from a living body by extraction, isolation or the like or is further subjected to chemical processing, chemical modification or the like and which is labeled with a labeling substance such as a fluorescent substance, dye or the like, thereby forming a micro-array, irradiating the micro-array with a stimulating ray, photoelectrically detecting light such as a fluorescence emitted from a labeling substance such as a fluorescent substance, dye or the like, and analyzing the substance derived from a living body. This micro-array image detecting system is advantageous in that a substance derived from a living body can be analyzed in a short time period by forming a number of spots of a specific binding substance at different positions of the surface of a carrier such as a slide glass plate with high density and hybridizing them with a substance derived from a living body and labeled with a labeling substance.

Since the autoradiographic image detecting system, the chemiluminescent image detecting system, the image detecting system using an electron microscope, the radiographic diffraction image detecting system, the fluorescent image detecting system and the micro-array image detecting system are used for the similar purposes, it is desirable to develop an image reading apparatus which can be used in common for all of these systems. In fact, an image reading apparatus which can be used in common for the autoradiographic image detecting system, the chemiluminescent image detecting system, the image detecting system using an electron microscope and the radiographic diffraction image detecting system using a stimulable phosphor sheet, and the fluorescent image detecting system has been already developed, and an image reading apparatus which can be used in common for the chemiluminescent image detecting system capable of forming a chemiluminescent image without using a stimulable phosphor sheet and the fluorescent image detecting system has also been already developed.

However, in the fluorescent image detecting system, since fluorescent light emitted from a fluorescent substance contained in a gel support or a transfer support and stimulated is detected, the image reading apparatus has to include an optical system having a great focal depth, and in the autoradiographic image detecting system, the chemiluminescent image detecting system, the image detecting system using an electron microscope and the radiographic diffraction image detecting system using a stimulable phosphor sheet, since stimulated emission is emitted from stimulable phosphors in a stimulable phosphor layer formed on the surface of the stimulable phosphor sheet, the image reading apparatus has to include an optical system having relatively great focal depth. To the contrary, in an image reading apparatus for the micro-array image detecting system, since a micro-array image is photoelectrically detected by detecting fluorescent light from a fluorescent substance labeling a substance derived from a living body hybridized with a specific binding substance on the surface of a slide glass plate, a membrane filter or the like, it is required to employ a confocal optical system for improving the S/N ratio.

Therefore, in the image reading apparatus for the micro-array image detecting system, since the focal depth of the optical system thereof is shallow, a micro-array image can be read with a high S/N ratio but it is impossible to produce image data having sufficiently high signal intensity by photoelectrically detecting fluorescent light emitted from a fluorescent substance contained in a gel support or a transfer support or stimulated emission emitted from a stimulable phosphor sheet.

In particular, in the image reading apparatus for the micro-array image detecting system, it is often required to carry out a preliminary test to read a fluorescent image of a specimen electrophoresed on a gel support or a transfer support. However, a conventional image reading apparatus for the micro-array image detecting system cannot read such a fluorescent image with high sensitivity and, therefore, another type of an image reading apparatus has to be used for reading such a fluorescent image.

SUMMARY OF THE INVENTION

It is therefore an object of the present invention to provide an image reading apparatus which can be used for not only a micro-array image detecting system but also an autoradiographic image detecting system, a chemiluminescent image detecting system, an image detecting system using an electron microscope and a radiographic diffraction image detecting system using a stimulable phosphor sheet and a fluorescent image detecting system.

The above other objects of the present invention can be accomplished by an image reading apparatus comprising at least one laser stimulating ray source, a stage on which two or more kinds of image carriers can selectively be placed, a scanning mechanism for scanning the image carrier with a laser beam emitted from the at least one laser stimulating ray source, thereby stimulating the image carrier, a light detector for photoelectrically detecting light emitted from the image carrier in response to stimulation by the laser beam and a confocal optical system for leading light emitted from the image carrier to the light detector, the image reading apparatus further comprising a confocal switching means having diameter-variable pinhole means and disposed between the confocal optical system and the light detector and whose pinhole diameter is variable.

According to the present invention, light emitted from the image carrier is guided by the confocal optical system and detected by the light detector via the confocal switching means having diameter-variable pinhole means. Therefore, when the image reading apparatus is used for the micro-array image detecting system, a micro-array image can be read with a high S/N ratio by focusing light emitted from the surface of a slide glass plate, a membrane filter or the like onto a pinhole having a small diameter of the confocal switching means using the confocal optical system and detecting it by the light detector, and when the image reading apparatus is used for photoelectrically reading fluorescent light emitted from the inside of a gel support or a transfer support or stimulated emission emitted from the inside of a stimulable phosphor layer formed on a stimulable phosphor sheet, image data having sufficiently high signal intensity can be produced by causing the light detector to detect light emitted from the image carrier via a pinhole having a large diameter of the confocal switching means.

In the present invention, diameter-variable pinhole means as termed here includes not only a plurality of pinholes having different diameters but also means having at least one pinhole and retracted so that no pinhole is located in the light path.

In a preferred aspect of the present invention, the confocal switching means is constituted by a rectangular plate member formed with a plurality of pinholes having different diameters and the image reading apparatus further comprises drive means for sliding the confocal switching means so that the respective pinholes can be selectively located in a path of light emitted from the image carrier.

According to this preferred aspect of the present invention, a desired pinhole can be located very easily by selecting the desired pinhole in accordance with the kind of image carrier and sliding the confocal switching means. Therefore, when the image reading apparatus is used for the micro-array image detecting system, a micro-array image can be read with a high S/N ratio very easily by focusing light emitted from the surface of a slide glass plate, a membrane filter or the like onto a pinhole having a small diameter of the confocal switching means using the confocal optical system and detecting it by the light detector and when the image reading apparatus is used for photoelectrically reading fluorescent light emitted from the inside of a gel support or a transfer support or stimulated emission emitted from the inside of a stimulable phosphor layer formed on a stimulable phosphor sheet, image data having sufficiently high signal intensity can be produced very easily by causing the light detector to detect light emitted from the image carrier via a pinhole having a large diameter of the confocal switching means.

In another preferred aspect of the present invention, the confocal switching means is constituted by a circular plate member formed with a plurality of pinholes having different diameters and the image reading apparatus further comprises drive means for rotating the confocal switching means so that the respective pinholes can be selectively located in a path of light emitted from the image carrier.

According to this preferred aspect of the present invention, a desired pinhole can be located very easily by selecting the desired pinhole in accordance with the kind of image carrier and rotating the confocal switching means. Therefore, when the image reading apparatus is used for the micro-array image detecting system, a micro-array image can be read with a high S/N ratio very easily by focusing light emitted from the surface of a slide glass plate, a membrane filter or the like onto a pinhole having a small diameter of the confocal switching means using the confocal optical system and detecting it by the light detector and when the image reading apparatus is used for photoelectrically reading fluorescent light emitted from the inside of a gel support or a transfer support or stimulated emission emitted from the inside of a stimulable phosphor layer formed on a stimulable phosphor sheet, image data having sufficiently high signal intensity can be produced very easily by causing the light detector to detect light emitted from the image carrier via a pinhole having a large diameter of the confocal switching means.

In another preferred aspect of the present invention, the confocal switching means is constituted by an iris diaphragm whose center portion is located in a path of light emitted from the image carrier and the image reading apparatus further comprises a drive means for adjusting a diameter of the iris diaphragm.

According to this preferred aspect of the present invention, a desired pinhole can be located very easily by using the drive means to adjust the diameter of the iris diaphragm in accordance with the kind of image carrier so as to make it equal to a desired. Therefore, when the image reading apparatus is used for the micro-array image detecting system, a micro-array image can be read with a high S/N ratio very easily by focusing light emitted from the surface of a slide glass plate, a membrane filter or the like onto a pinhole having a small diameter of the confocal switching means using the confocal optical system and detecting it by the light detector, and when the image reading apparatus is used for photoelectrically reading fluorescent light emitted from the inside of a gel support or a transfer support or stimulated emission emitted from the inside of a stimulable phosphor layer formed on a stimulable phosphor sheet, image data having sufficiently high signal intensity can be produced very easily by causing the light detector to detect light emitted from the image carrier via a pinhole having a large diameter of the confocal switching means.

In a further preferred aspect of the present invention, the confocal switching means is constituted by a plate-like member formed with a single pinhole and the image reading apparatus further comprises a drive means for sliding the confocal switching means between a confocal position where the single pinhole is located in a path of light emitted from the image carrier and a retracted position where the single pinhole is retracted from the path of light emitted from the image carrier.

According to this preferred aspect of the present invention, the confocal switching means can be moved by the drive means so that the single pinhole can be located in the path of light emitted from image carrier. Therefore, when the image reading apparatus is used for the micro-array image detecting system, a micro-array image can be read with a high S/N ratio very easily by focusing light emitted from the surface of a slide glass plate, a membrane filter or the like onto a pinhole having a small diameter of the confocal switching means using the confocal optical system and detecting it by the light detector and when the image reading apparatus is used for photoelectrically reading fluorescent light emitted from the inside of a gel support or a transfer support or stimulated emission emitted from the inside of a stimulable phosphor layer formed on a stimulable phosphor sheet, image data having sufficiently high signal intensity can be produced very easily by causing the light detector to detect light emitted from the image carrier via a pinhole having a large diameter of the confocal switching means.

In a further preferred aspect of the present invention, the image reading apparatus further comprises a holder sensor for detecting the kind of a holder supporting the image carrier placed on the stage and a confocal switching control means for controlling the drive means in accordance with a detection signal of the holder sensor.

According to this preferred aspect of the present invention, a desired pinhole can be automatically located in the path of light emitted from the image carrier in accordance with the detection signal of the holder sensor. Therefore, when the image reading apparatus is used for the micro-array image detecting system, a micro-array image can be read with a high S/N ratio very easily and reliably by focusing light emitted from the surface of a slide glass plate, a membrane filter or the like onto a pinhole having a small diameter of the confocal switching means using the confocal optical system and detecting it by the light detector, and when the image reading apparatus is used for photoelectrically reading fluorescent light emitted from the inside of a gel support or a transfer support or stimulated emission emitted from the inside of a stimulable phosphor layer formed on a stimulable phosphor sheet, image data having sufficiently high signal intensity can be produced very easily and reliably by causing the light detector to detect light emitted from the image carrier via a pinhole having a large diameter of the confocal switching means.

In a further preferred aspect of the present invention, the two or more kinds of image carriers include at least a DNA micro-array.

In a further preferred aspect of the present invention, the two or more kinds of image carriers include at least one kind of image carrier selected from a group consisting of a support carrying an image of a fluorescent substance produced by a fluorescent image detecting system, a stimulable phosphor sheet carrying an autoradiographic image, a stimulable phosphor sheet carrying an image of an electron microscope, a stimulable phosphor sheet carrying a radiographic diffraction image, and a stimulable phosphor sheet carrying a chemiluminescent image.

The above and other objects and features of the present invention will become apparent from the following description made with reference to the accompanying drawings.

DESCRIPTION OF THE PREFERRED EMBODIMENT

Figure 1:
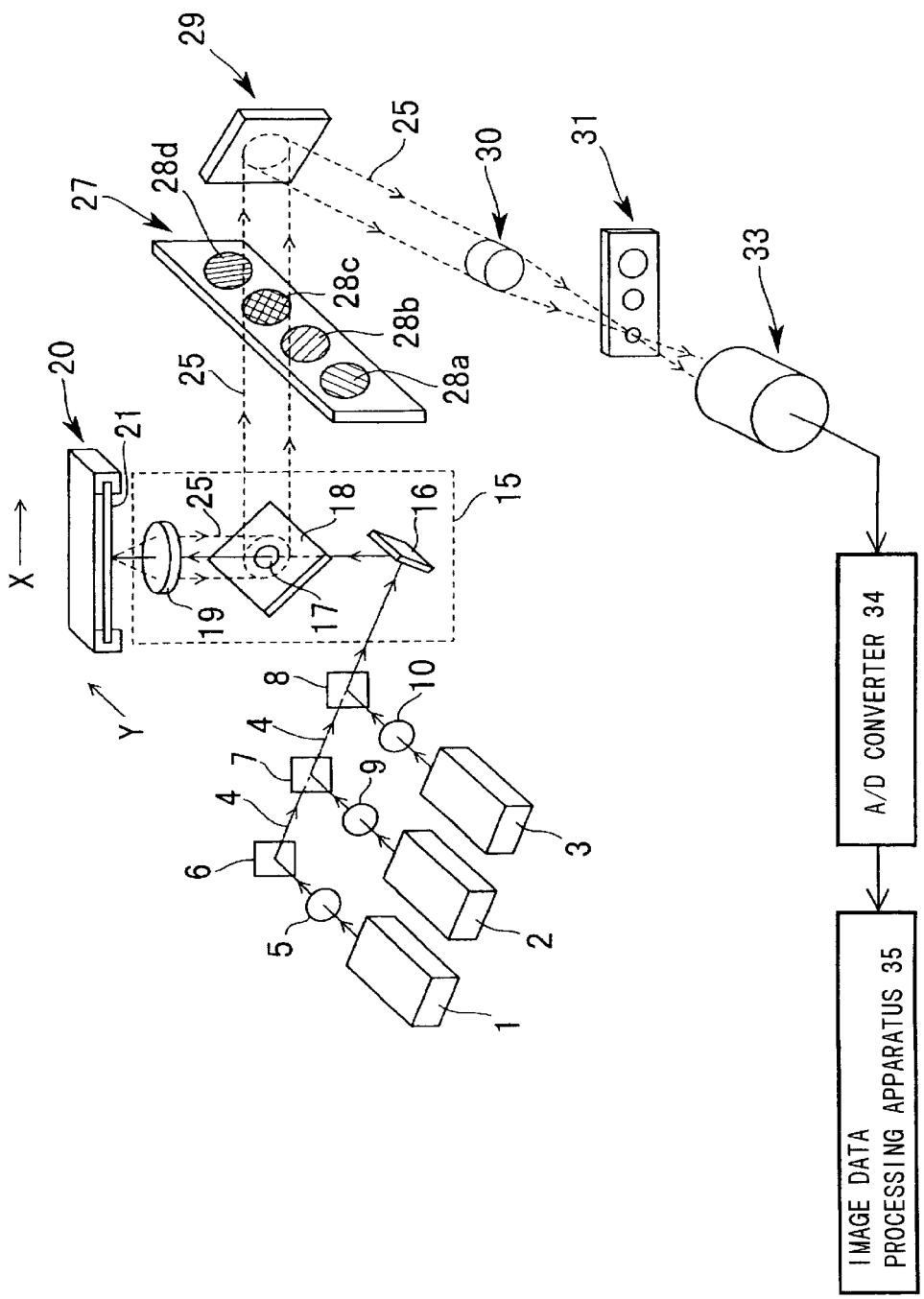
FIG. 1 is a schematic perspective view showing an image reading apparatus which is a preferred embodiment of the present invention.

FIG. 1 is a schematic perspective view showing an image reading apparatus which is a preferred embodiment of the present invention.

As shown in FIG. 1, an image reading apparatus includes a first laser stimulating ray source 1 for emitting a laser beam having a wavelength of 640 nm, a second laser stimulating ray source 2 for emitting a laser beam having a wavelength of 532 nm and a third laser stimulating ray source 3 for emitting a laser beam having a wavelength of 473 nm. In this embodiment, the first laser stimulating ray source 1 constituted by a semiconductor laser beam source and the second laser stimulating ray source 2 and the third laser stimulating ray source 3 are constituted by a second harmonic generation element.

A laser beam 4 emitted from the first laser stimulating source 1 passes through a collimator lens 5, thereby being made a parallel beam and is reflected by a mirror 6. A first dichroic mirror 7 for transmitting light having a wavelength of 640 nm but reflecting light having a wavelength of 532 nm and a second dichroic mirror 8 for transmitting light having a wavelength equal to and longer than 532 nm but reflecting light having a wavelength of 473 nm are provided in an optical path of the laser beam 4 reflected by the mirror 6. The laser beam 4 emitted from the first laser stimulating ray source 1 passes through the first dichroic mirror 7 and the second dichroic mirror 8 and enters an optical unit 15.

On the other hand, the laser beam 4 emitted from the second laser stimulating ray source 2 passes through a collimator lens 9, thereby being made a parallel beam and is reflected by the first dichroic mirror 7, thereby changing its direction by 90 degrees. The laser beam 4 then passes through the second dichroic mirror 8 and enters the optical unit 15.

Further, the laser beam 4 emitted from the third laser stimulating ray source 3 passes through a collimator lens 10, thereby being made a parallel beam and is reflected by the second dichroic mirror 8, thereby changing its direction by 90 degrees.

The optical unit 15 includes a mirror 16, a perforated mirror 18 whose center portion is formed with a hole 17 and a lens 19. The laser beam 4 entering on the optical unit 15 is reflected by the mirror 16 and passes through the hole 17 formed in the perforated mirror 18 and the lens 19, thereby entering an image carrier 21 set on a stage 20. The stage 20 is constituted so as to be movable in the X-Y directions in FIG. 1.

The image reading apparatus according to this embodiment is constituted so as to read a micro-array image of a fluorescent dye carried in a DNA micro-array, an electrophoresis image of a fluorescent dye carried in a gel support or a transfer support and an autoradiographic image regarding locational information of a radioactively labeling substance recorded in a stimulable phosphor layer formed on a stimulable phosphor sheet.

A DNA micro-array is prepared in the following manner, for example.

First, the surface of a slide glass plate is pretreated with a poly-L-lysine solution and so forth, and then cDNAs which are specific binding substances, each of which has a known base sequence and is different from each other, are spotted onto predetermined positions on the surface of the slide glass plate by using a spotter device.

On the other hand, a specimen of mRNA is extracted from biological cells, and RNA having poly A at 3' terminal is extracted from the mRNA. Then, cDNA is synthesized from the thus extracted RNA having poly A at 3' terminal in the presence of a labeling substance, Cy-5 (registered trademark), to prepare probe DNA labeled with Cy-5.

Figure 2:
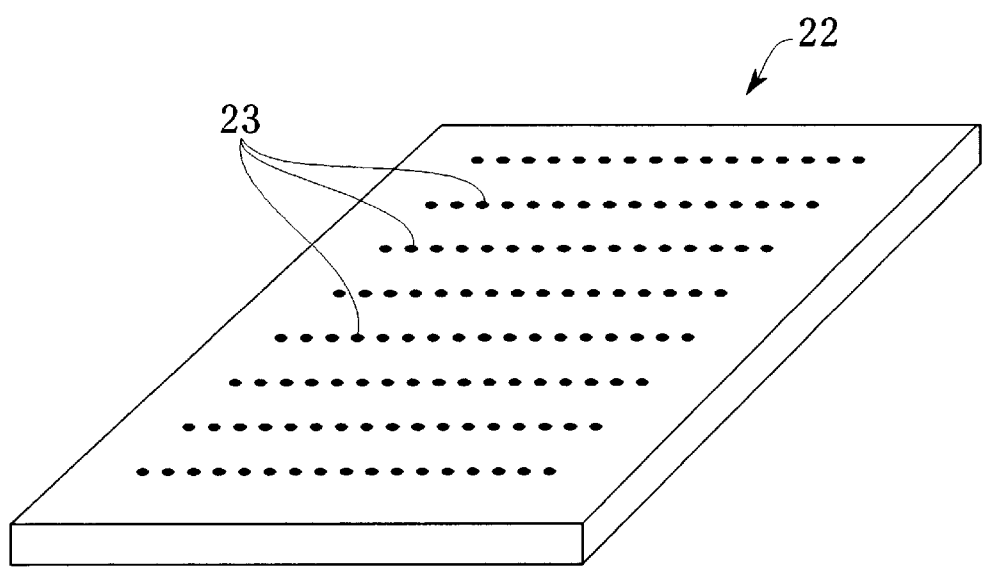
FIG. 2 is a schematic perspective view showing a DNA micro-array.

A solution of the thus obtained probe DNA labeled with Cy-5 is prepared, and is gently loaded onto the surface of the slide glass on which cDNAs, specific binding substances, are spotted, and then hybridization is performed. FIG. 2 is a schematic perspective view of a DNA micro-array 22. The reference numeral 23 in FIG. 2 designates thus spotted cDNA.

On the other hand, an electrophoresis image of denatured DNA fragments labeled with a fluorescent dye is, for example, recorded in a transfer support in the following manner.

First, a plurality of DNA fragments containing a specific gene are separated and distributed on a gel support medium by means of electrophoresis and are denatured by alkali processing to form single-stranded DNA.

Then, according to the known Southern blotting method, the gel support and a transfer support are stacked to transfer at least a part of the denatured DNA fragments onto the transfer support and the transferred DNA fragments are fixed on the transfer support by heating and irradiating with an ultraviolet ray.

Further, probes prepared by labeling DNA or RNA with fluorescent dye, which is complementary to the DNA containing the specific gene, and the denatured DNA fragments on the transfer support are hybridized by heating to form double-stranded DNA fragments or combined DNA and RNA. Then, DNA or RNA which is complementary to the DNA containing DNA of the specific gene is labeled with a fluorescent dye such as Fluorescein, Rhodamine or Cy-5 to prepare the probes. Since the denatured DNA fragments are fixed on the transfer support at this time, only the DNA fragments which are complimentary to the probe DNA or probe RNA are hybridized to acquire the fluorescently labeled probe. Then, the probes which have not formed hybrids are removed by washing with a proper solution and only the DNA fragments having a specific gene form hybrids with the fluorescently labeled DNA or RNA on the transfer support to be fluorescently labeled. The thus obtained transfer support records an electrophoresis image of the denatured DNA labeled with fluorescent dye.

Further, locational information regarding a radioactively labeling substance is recorded in a stimulable phosphor layer formed on the stimulable sheet in following manner. Here, Locational information as termed here includes a variety of information relating to the location of radioactive labeled substances, or aggregations thereof, present in a specimen, such as the location, the shape, the concentration, the distribution or combinations thereof.

When locational information regarding a radioactively labeling substance for example, in a gene obtained using a Southern blot-hybridization method is to be recorded in the stimulable phosphor layer formed on the stimulable sheet, first, a plurality of DNA fragments containing a specific gene are separated and distributed on a gel support medium by means of electrophoresis and are denatured by alkali processing to form single-stranded DNA.

Then, according to the known Southern blotting method, the gel support and a transfer support such as a nitrocellulose filter are placed in layers to transfer at least a part of the denatured DNA fragments onto the transfer support and the transferred DNA fragments are fixed on the transfer support by heating and irradiating with an ultraviolet ray.

Further, probes prepared by radioactively labeling DNA or RNA which is complementary to the DNA containing the specific gene and the denatured DNA fragments are hybridized by heating to form double-stranded DNA fragments or combined DNA and RNA. Since the denatured DNA fragments are fixed on the transfer support at this time, only the DNA fragments which are complimentary to the probe DNA or probe RNA are hybridized to acquire the radioactively labeled probe.

Then, the probes which have not formed hybrids are removed by washing with a proper solution and only the DNA fragments having a specific gene form hybrids with the radioactively labeled DNA or RNA on the transfer support to be radioactively labeled. The thus obtained transfer support is dried and the transfer support and the stimulable phosphor sheet are stacked for a certain period of time to expose the stimulable phosphor layer and at least a part of the radiation emitted from the radioactively labeling substance on the transfer support is absorbed in the stimulable phosphor layer formed on the stimulable phosphor sheet, whereby the locational information regarding the radioactively labeled substance in the specimen is stored in the form of an image in the stimulable phosphor layer.

When the laser beam 4 is impinged on the image carrier 21 from the optical unit 15, a fluorescent substance is excited by the laser beam 4 to release fluorescent light in the case where the image carrier 21 is a DNA micro-array, or a gel support or a transfer support carrying an image of the fluorescent substance. On the other hand, in case where the image carrier 21 is a stimulable phosphor sheet carrying an autoradiographic image regarding locational information of a radioactively labeling substance, stimulable phosphors contained in the stimulable phosphor sheet are excited by the laser beam 4 to release stimulated emission.

The fluorescent light or the stimulated emission 25 released from the image carrier 21 is made into a parallel beam by the lens 19 of the optical unit 15 and reflected by the perforated mirror 18, thereby entering one of filters 28a, 28b, 28c and 28d of a filter unit 27.

The filter unit 27 is constituted to be laterally movable in FIG. 1 by a motor (not shown) so that a predetermined one of the filters 28a, 28b, 28c and 28d is located in the optical path of the fluorescent light or the stimulated emission 25 depending upon the kind of the laser stimulating ray source to be used.

The filter 28a is used for reading fluorescent light released from fluorescent substance contained in the image carrier 21 upon being excited using the first laser stimulating ray source 1 and has a property to cut off light having a wavelength of 640 nm but transmit light having a wavelength longer than 640 nm. The filter 28b is used for reading fluorescent light released from fluorescent substance contained in the image carrier 21 upon being excited using the second laser stimulating ray source 2 and has a property to cut off light having a wavelength of 532 nm but transmit light having a wavelength longer than 532 nm. The filter 28c is used for reading fluorescent light released from fluorescent substance contained in the image carrier 21 upon being excited using the third laser stimulating ray source 3 and has a property to cut off light having a wavelength of 473 nm but transmit light having a wavelength longer than 473 nm. The filter 28d is used in the case where the image carrier 21 is a stimulable phosphor sheet for reading stimulated emission released from stimulable phosphor contained in the stimulable phosphor sheet upon being excited using the first laser stimulating ray source 1 and has a property to transmit only light having a wavelength corresponding to that of stimulated emission emitted from stimulable phosphor but cut off light having a wavelength of 640 nm. Therefore, in accordance with the kind of a stimulating ray source to be used, namely, depending upon whether the image to be read is a fluorescent image or an image regarding locational information of a radioactively labeling substance and the kind of fluorescent substance labeling a specimen, one of these filters 28a, 28b, 28c, 28d is selectively used, thereby cutting light of wavelengths which cause noise.

After a fluorescent light or a stimulated emission passes through one of the filters 28a, 28b, 28c, 28d, whereby light of a predetermined wavelength region is cut, the fluorescent light or the stimulated emission advances to a mirror 29 and is reflected thereby to be focused by a lens 30.

The lens 19 and the lens 30 constitute a confocal optical system. The reason for employing a confocal optical system is to enable a fluorescent light emitted from a minute spot formed on a slide glass plate to be read with a high S/N ratio when the image to be read is carried in a DNA micro-array.

A confocal switching member 31 is provided at the focal point of the lens 30.

Figure 3:
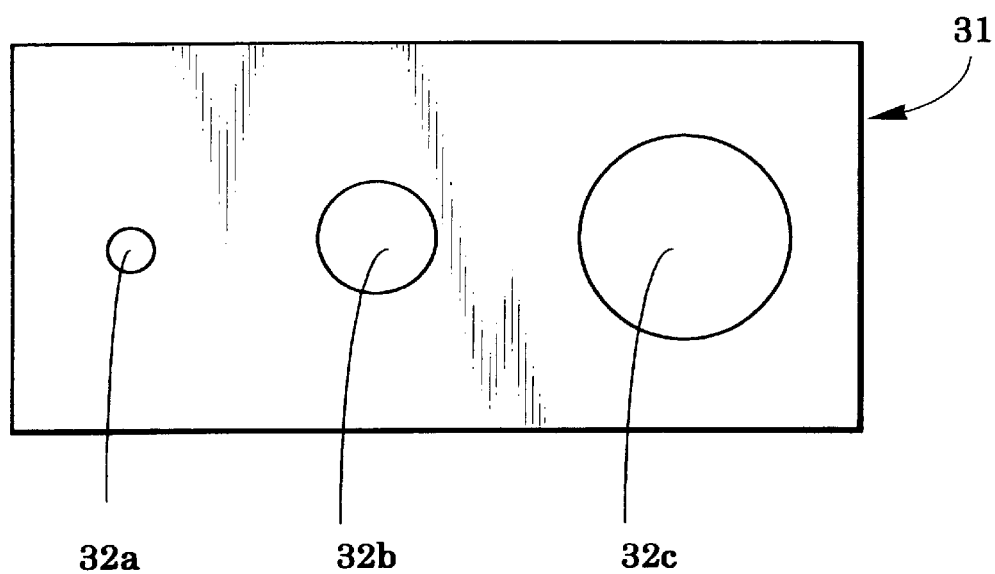
FIG. 3 is a schematic front view showing a confocal switching member.

FIG. 3 is a schematic front view showing the confocal switching member 31.

As shown in FIG. 3, the confocal switching member 31 is formed plate-like and with three pinholes 32a, 32b, 32c. The pinhole 32a having the smallest diameter is located in a light path of a fluorescent light emitted from the DNA micro-array when a fluorescent image carried in the DNA micro-array is to be read and the pinhole 32c having the largest diameter is located in a light path of a fluorescent light emitted from a transfer support or a gel support when a fluorescent image carried in the transfer support or the gel support is to be read. Further, the pinhole 32b having an intermediate diameter is located in a light path of a stimulated emission released from a stimulable phosphor layer when an autoradiographic image regarding locational information and recorded in the stimulable phosphor layer formed on a stimulable phosphor sheet is to be read.

In this manner, the confocal switching member 31 is provided at the focal point of the lens 30 and the pinhole 32a having the smallest diameter is located in the light path of a fluorescent light when a fluorescent image carried in the DNA micro-array is to be read. This is because when a fluorescent image carried in the DNA micro-array is read by exciting a fluorescent substance using a laser beam 4, fluorescent light is emitted from the surface of the slide glass plate and the depth of the light emitting points in the slide glass plate is substantially constant, so that it is preferable to use a confocal optical system to focus an image on the pinhole 32a having the smallest diameter for improving the S/N ratio.

On the other hand, the pinhole 32c is located in the light path of a fluorescent light when a fluorescent image carried in the transfer support or the gel support is to be read. This is because when a fluorescent image carried in the transfer support or the gel support is read by exciting a fluorescent substance using a laser beam 4, the positions of the light emitting points fluctuate in the depth direction because the fluorescent substance are distributed in the depth direction of the transfer support or the gel support, so that it is impossible to focus an image on a pinhole having a small diameter even when a confocal optical system is used, and a fluorescent light emitted from the specimen is cut if a pinhole having a small diameter is used, whereby signals having a sufficient intensity cannot be obtained and, therefore, it is necessary to use the pinhole 32c having the largest diameter.

When an autoradiographic image regarding locational information and recorded in the stimulable phosphor layer formed on a stimulable phosphor sheet is to be read, the pinhole 32b having an intermediate diameter is located in a light path of a stimulated emission. This is because when an autoradiographic image is read by exciting a stimulable phosphor contained in the stimulable phosphor layer using a laser beam 4, the positions of the light emitting points fluctuate in the depth direction because the light emitting points of a stimulated emission are distributed in the depth direction of the stimulable phosphor layer, so that it is impossible to focus an image on a pinhole having a small diameter even when a confocal optical system is used, and the stimulated emission emitted from the specimen is cut if a pinhole having a small diameter is used, whereby signals having a sufficient intensity cannot be obtained by photo-electrically detecting the stimulated emission but the distribution of the light emitting points in the depth direction and the fluctuation in positions of the light emitting points in the depth direction are no so great as those for reading a fluorescent image carried in the transfer support or the gel support and, therefore, it is preferable to employ the pinhole 32b having an intermediate diameter.

The fluorescent light or stimulated emission passing through the confocal switching member 31 is photoelectrically detected by a photomultiplier 33, thereby producing analog data. The analog data produced by the photomultiplier 33 are converted by an A/D converter 34 into digital data and the digital data are fed to an image data processing apparatus 35.

Figure 4:
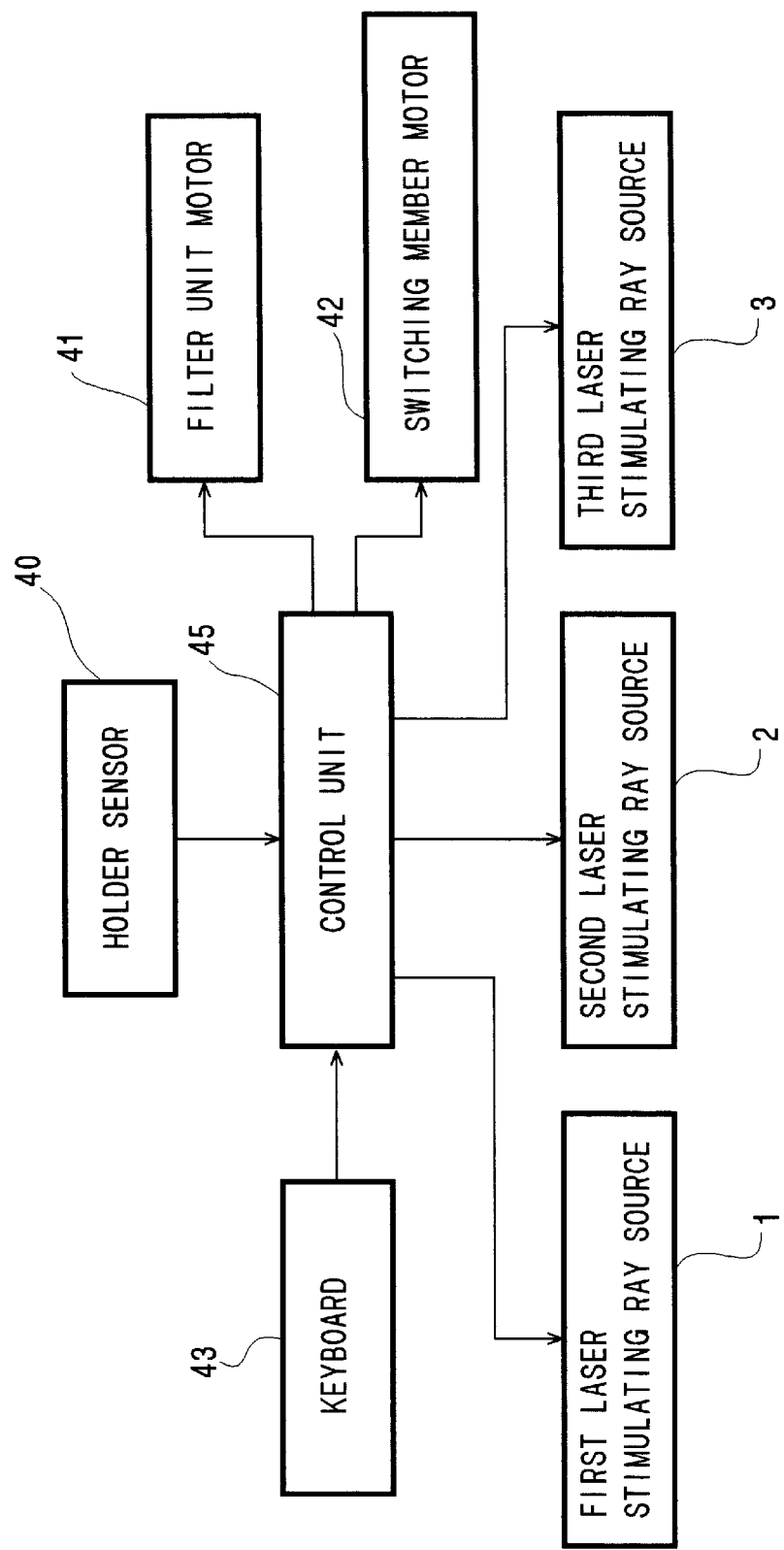
FIG. 4 is a block diagram of a detection system, a drive system, an input system and a control system of an image reading apparatus which is a preferred embodiment of the present invention.

FIG. 4 is a block diagram of a detection system, a drive system, an input system and a control system of the image reading apparatus which is a preferred embodiment of the present invention.

As shown in FIG. 4, the detection system of the image reading apparatus includes a holder sensor 40 for detecting the kind of holder set on the stage 20 for gripping an image carrier 21, and the drive system of the image reading apparatus includes a filter unit motor 41 for moving the filter unit 27 and a switching member motor 42 for moving the confocal switching member 31.

The input system of the image reading apparatus includes a keyboard 43 and the control system of the image reading apparatus includes a control unit 45.

The thus constituted image reading apparatus according to this embodiment reads a fluorescent image carried in a DNA micro-array and produces digital image data in the following manner.

When a DNA micro-array is set on the stage 20 as an image carrier 21, the kind of holder (not shown) for gripping the image carrier 21 is detected by the holder sensor 40 and a holder detection signal is output to the control unit 45.

When the control unit 45 receives the holder detection signal from the holder sensor 40, it outputs a drive signal to the switching member motor 42 based on the holder detection signal, thereby moving the confocal switching member 31 so that the pinhole 32a having the smallest diameter is located in the light path.

Then, the kind of fluorescent substance serving as a labeling substance and a start signal are input through the keyboard 43 by an operator and an instruction signal is output from the keyboard 43 to the control unit 45.

When the kind of fluorescent substance, for instance, Cy-5, is input, the control unit 45 outputs a drive signal to the filter unit motor 41 in accordance with the input instruction signal, thereby moving the filter unit 27 so as to locate the filter 28a having a property to cut off light having a wavelength of 640 nm but transmit light having a wavelength longer than 640 nm in the light path and outputs a drive signal to the first laser stimulating ray source 1, thereby turning it on.

A laser beam 4 emitted from the first laser stimulating ray source 1 passes through the collimator lens 5, thereby being made a parallel beam and is reflected by the mirror 6. The laser beam 4 passes through the first dichroic mirror 7 and the second dichroic mirror 8 and enters the optical unit 15.

The laser beam 4 entering the optical unit 15 is reflected by the mirror 16, passes through the hole 17 formed in the perforated mirror 18 and through the lens 19 to impinge on the DNA micro-array set on the stage 20 as an image carrier 21.

The stage 20 is moved in the X-Y directions in FIG. 1 by a scanning mechanism (not shown) so that the entire surface of the DNA micro-array is scanned with the laser beam 4.

When the DNA micro-array is irradiated with the laser beam 4, the fluorescent substance labeling the probe DNA, for example, Cy-5, is excited, thereby releasing fluorescent light. In the case of the DNA micro-array, since the fluorescent substance is distributed only in the vicinity of the surface thereof, fluorescent light is released only from the surface of the DNA micro-array.

The fluorescent light emitted from the surface of the DNA micro-array passes through the lens 19, thereby being made a parallel beam and is reflected by the perforated mirror 18, thereby entering the filter unit 27.

Since the filter unit 27 has been moved so that the filter 28a is located in the light path, the fluorescent light enters the filter 28a, thereby cutting light having a wavelength of 640 nm and transmitting only light having a wavelength longer than 640 nm.

The fluorescent light transmitted through the filter 28a is reflected by the mirror 29 and condensed by the lens 30.

Since the confocal switching member 31 has been moved so that the pinhole 32a having the smallest diameter is located in the light path prior to irradiation with the laser beam 4, the fluorescent light is focused onto the pinhole 32a and is photoelectrically detected by the photomultiplier 33, thereby producing analog data. The fluorescent light emitted from the fluorescent substance distributed on the surface of the DNA micro-array is led to the photomultiplier 33 using the confocal optical system in this manner and, therefore, noise in the image data can be minimized.

The analog data produced by the photomultiplier 33 are converted into digital data by the A/D converter 34 and the digital data are fed to the image data processing apparatus 35.

On the other hand, when a fluorescent image carried in a transfer support or a gel support is to be read, the transfer support or the gel support is set on the stage 20 as an image carrier 21.

When the transfer support or the gel support is set on the stage 20, the kind of holder (not shown) for gripping the image carrier 21 is detected by the holder sensor 40 and a bolder detection signal is output to the control unit 45.

When the control unit 45 receives the holder detection signal from the holder sensor 40, it outputs a drive signal to the switching member motor 42 based on the holder detection signal, thereby moving the confocal switching member 31 so that the pinhole 32c having the largest diameter is located in the light path.

Then, the kind of fluorescent substance serving as a labeling substance and a start signal are input through the keyboard 43 by an operator and an instruction signal is output from the keyboard 43 to the control unit 45.

When the kind of fluorescent substance, for instance, Fluorescein, is input, the control unit 45 outputs a drive signal to the filter unit motor 41 in accordance with the input instruction signal, thereby moving the filter unit 27 so as to locate the filter 28c having a property to cut off light having a wavelength of 473 nm but transmit light having a wavelength longer than 473 nm in the light path and outputs a drive signal to the third laser stimulating ray source 3, thereby turning it on.

A laser beam 4 emitted from the third laser stimulating ray source 3 passes through a collimator lens 10, thereby being made a parallel beam and is reflected by the second dichroic mirror 7, thereby entering the optical unit 15.

The laser beam 4 entering the optical unit 15 is reflected by the mirror 16, passes through the hole 17 formed in the perforated mirror 18 and through the lens 19 to impinge on the transfer support or the gel support set on the stage 20 as an image carrier 21.

The stage 20 is moved in the X-Y directions in FIG. 1 by a scanning mechanism (not shown) so that the entire surface of the transfer support or the gel support is scanned with the laser beam 4.

When the transfer support or the gel support is irradiated with the laser beam 4, the fluorescent substance labeling the denatured DNA, for example, Fluorescein, is excited, thereby releasing a fluorescent light. In the case of the transfer support or the gel support, since the fluorescent substance is distributed in the depth direction of the transfer support or the gel support, fluorescent light is released from a predetermined region in the depth direction of the transfer support or the gel support and the positions of light emitting points vary in the depth direction.

The fluorescent light emitted from the transfer support or the gel support passes through the lens 19, thereby being made a parallel beam and is reflected by the perforated mirror 18, thereby entering the filter unit 27.

Since the filter unit 27 has been moved so that the filter 28c is located in the light path, the fluorescent light enters the filter 28c, thereby cutting light having a wavelength of 473 nm and transmitting only light having a wavelength longer than 473 nm.

The fluorescent light transmitted through the filter 28c is reflected by the mirror 29 and condensed by the lens 30. However, since the fluorescent light is released from the predetermined region in the depth direction of the transfer support or the gel support, it is not focused.

Since the confocal switching member 31 has been moved so that the pinhole 32c having the largest diameter is located in the light path prior to irradiation with the laser beam 4, the fluorescent light passes through the pinhole 32c having the largest diameter and is photoelectrically detected by the photomultiplier 33, thereby producing analog data. Therefore, notwithstanding that the confocal optical system is employed for detecting fluorescent light released from a fluorescent substance distributed on the surface of a DNA micro-array with a high S/N ratio, the fluorescent light emitted from the predetermined region in the depth direction of the transfer support or the gel support can be detected with a high signal intensity.

The analog data produced by the photomultiplier 33 are converted into digital data by the A/D converter 34 and the digital data are fed to the image data processing apparatus 35.

Further, when an autoradiographic image regarding locational information and recorded in the stimulable phosphor layer formed on a stimulable phosphor sheet is to be read, a stimulable phosphor sheet is set on the stage 20 as an image carrier.

When the stimulable phosphor sheet is set on the stage 20, the kind of holder (not shown) for gripping the image carrier 21 is detected by the holder sensor 40 and a holder detection signal is output to the control unit 45.

When the control unit 45 receives the holder detection signal from the holder sensor 40, it outputs a drive signal to the switching member motor 42 based on the holder detection signal, thereby moving the confocal switching member 31 so that the pinhole 32b having an intermediate diameter is located in the light path.

Then, an instruction signal indicating that the image carrier 21 is a stimulable phosphor sheet and a start signal are input through the keyboard 43 by an operator and instruction signals are output from the keyboard 43 to the control unit 45.

When the control unit 45 receives the instruction signal indicating that the image carrier 21 is a stimulable phosphor sheet, it outputs a drive signal to the filter unit motor, thereby moving the filter unit 27 so as to locate the filter 28d having a property to transmit only light having a wavelength corresponding to that of stimulated emission emitted from stimulable phosphor but cut off light having a wavelength of 640 nm in the light path, and outputs a drive signal to the first laser stimulating ray source 1, thereby turning it on.

A laser beam 4 emitted from the first laser stimulating ray source 1 passes through the collimator lens 5, thereby being made a parallel beam and is reflected by the mirror 6. The laser beam 4 passes through the first dichroic mirror 7 and the second dichroic mirror 8 and enters the optical unit 15.

The laser beam 4 entering the optical unit 15 is reflected by the mirror 16, passes through the hole 17 formed in the perforated mirror 18 and through the lens 19 to impinge on the stimulable phosphor sheet set on the stage 20 as an image carrier 21.

The stage 20 is moved in the X-Y directions in FIG. 1 by a scanning mechanism (not shown) so that the entire surface of the stimulable phosphor layer formed on the stimulable phosphor sheet is scanned with the laser beam 4.

When the stimulable phosphor sheet is irradiated with the laser beam 4, the stimulable phosphor contained in the stimulable phosphor layer is stimulated, thereby releasing radiographic energy stored therein as a stimulated emission. In the case of the stimulable phosphor sheet, since the stimulable phosphor is contained in the stimulable phosphor layer and is distributed in the depth direction of the stimulable phosphor layer to a some extent, the stimulated emission is released from a predetermined region in the depth direction of the stimulable phosphor layer and the positions of the light emitting points fluctuate in the depth direction. However, since the stimulable phosphor layer is thin, the light emitting points are not distributed over such a wide region in the depth direction as those of the transfer support or the gel support.

The stimulated emission released from the stimulable phosphor layer formed on the stimulable phosphor sheet passes through the lens 19, thereby being made a parallel beam and is reflected by the perforated mirror 18, thereby entering the filter unit 27.

Since the filter unit 27 has been moved so that the filter 28d is located in the light path, the stimulated emission enters the filter 28d, thereby cutting light having a wavelength of 640 nm and transmitting only light having a wavelength corresponding to that of stimulated emission emitted from stimulable phosphor.

The stimulated emission transmitted through the filter 28d is reflected by the mirror 29 and condensed by the lens 30. However, since the stimulated emission is released from the predetermined region in the depth direction of the stimulable phosphor layer formed on the stimulable phosphor sheet, it is not focused.

Since the confocal switching member 31 has been moved so that the pinhole 32b having an intermediate diameter is located in the light path prior to irradiation with the laser beam 4, the stimulated emission passes through the pinhole 32b having the intermediate diameter and photoelectrically detected by the photomultiplier 33, thereby producing analog data. Therefore, notwithstanding that the confocal optical system is employed for detecting fluorescent light released from a fluorescent substance distributed on the surface of a DNA micro-array with a high S/N ratio, the stimulated emission emitted from the predetermined region in the depth direction of the stimulable phosphor layer formed on the stimulable phosphor sheet can be detected with a high signal intensity.

The analog data produced by the photomultiplier 33 are converted into digital data by the A/D converter 34 and the digital data are fed to the image data processing apparatus 35.

According to the above described embodiment, the lens 19 and the lens 30 constitute a confocal optical system and when an image carried in a DNA micro-array is to be read, a fluorescent image is focused on the pinhole 32a having the smallest diameter and photoelectrically detected by the photomultiplier 33. Therefore, fluorescent light released from minute spot-like specimens formed on a slide glass plate can be detected with a high S/N ratio. On the other hand, when a fluorescent image carried in a transfer support or a gel support is to be read by photoelectrically detecting a fluorescent light released from a predetermined region in the depth direction, the confocal switching member is moved so that the pinhole 32c having the largest diameter is located in the light path and when an autoradiographic image regarding locational information and recorded in the stimulable phosphor layer formed on a stimulable phosphor sheet is to be read by photoelectrically detecting a stimulated emission released from a certain region in the depth direction, the confocal switching member is moved so that the pinhole 32b having an intermediate diameter is located in the light path. Therefore, the fluorescent light or the stimulated emission is prevented from being cut and image data having high signal intensity can be produced.

Furthermore, according to the above described embodiment, a holder sensor 40 is provided for detecting the kind of holder for supporting an image carrier 21 and the confocal switching member 31 is automatically moved so that a desired pinhole 32a, 32b or 32c is located in the light path. Therefore, it is possible to prevent an operator from erroneously locating an improper pinhole 32a, 32b or 32c in the light path.

Figure 5:
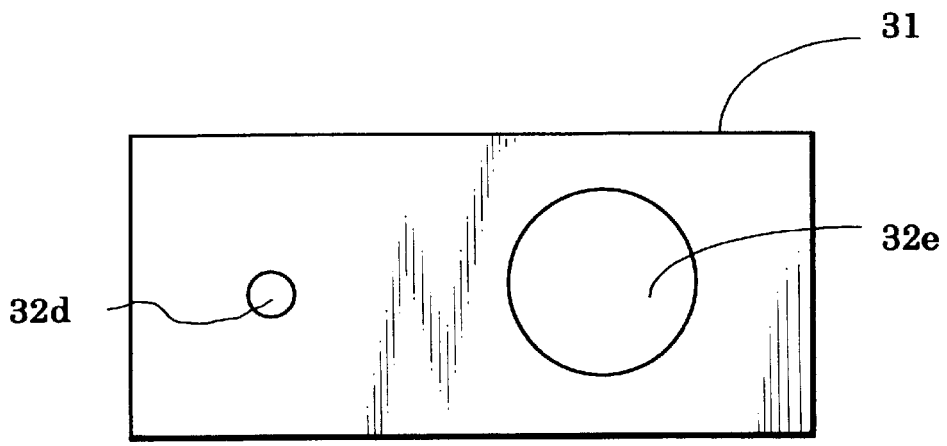
FIG. 5 is a schematic front view showing anther example of a confocal switching member.

FIG. 5 is a schematic front view showing another example of a confocal switching member.

As shown in FIG. 5, in this example, the confocal switching member 31 includes a pinhole 32d having a small diameter and a pinhole 32e having a large diameter. The confocal switching member 31 shown in FIG. 5 is moved so that the pinhole 32d having a small diameter is located in the light path when an image carried in a DNA micro-array is to be read and the confocal switching member 31 is moved so that the pinhole 32e having a large diameter is located in the light path when an autoradiographic image regarding locational information and recorded in the stimulable phosphor layer formed on a stimulable phosphor sheet is to be read. On the other hand, when a fluorescent image carried in a transfer support or a gel support is to be read, the confocal switching member 31 is retracted from the light path.

Figure 6:
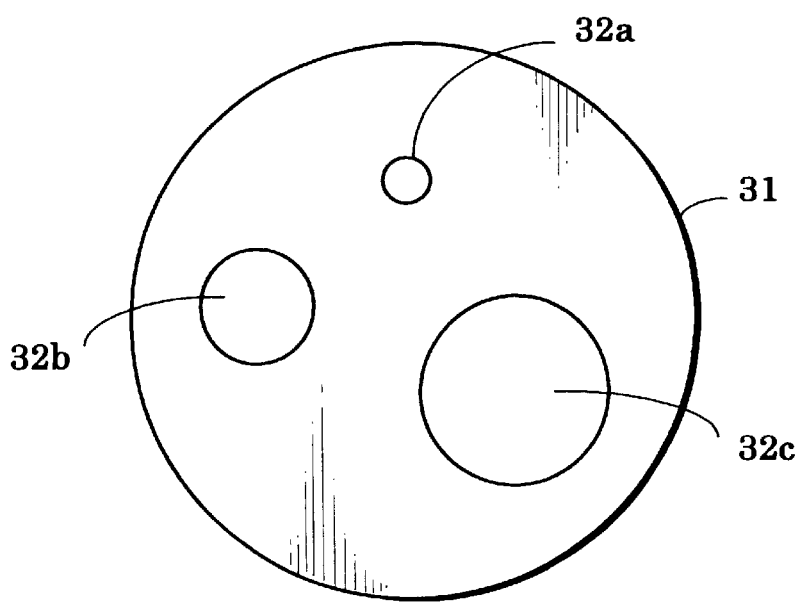
FIG. 6 is a schematic front view showing a further example of a confocal switching member.

FIG. 6 is a schematic front view showing a further example of a confocal switching member.

As shown in FIG. 6, in this example, the confocal switching member 31 is formed by a disk rotatable by a motor (not shown) and the disk is formed with pinholes 32a, 32b and 32c having different diameters. The confocal switching member 31 shown in FIG. 6 is rotated so that the pinhole 32a having the smallest diameter is located in the light path when an image carried in a DNA micro-array is to be read and the confocal switching member 31 is rotated so that the pinhole 32b having an intermediate diameter is located in the light path, when an autoradiographic image regarding a locational information and recorded in the stimulable phosphor layer formed on a stimulable phosphor sheet is to be read. When a fluorescent image carried in a transfer support or a gel support is to be read, the pinhole 32c having the largest diameter is located in the light path.

Figure 7:
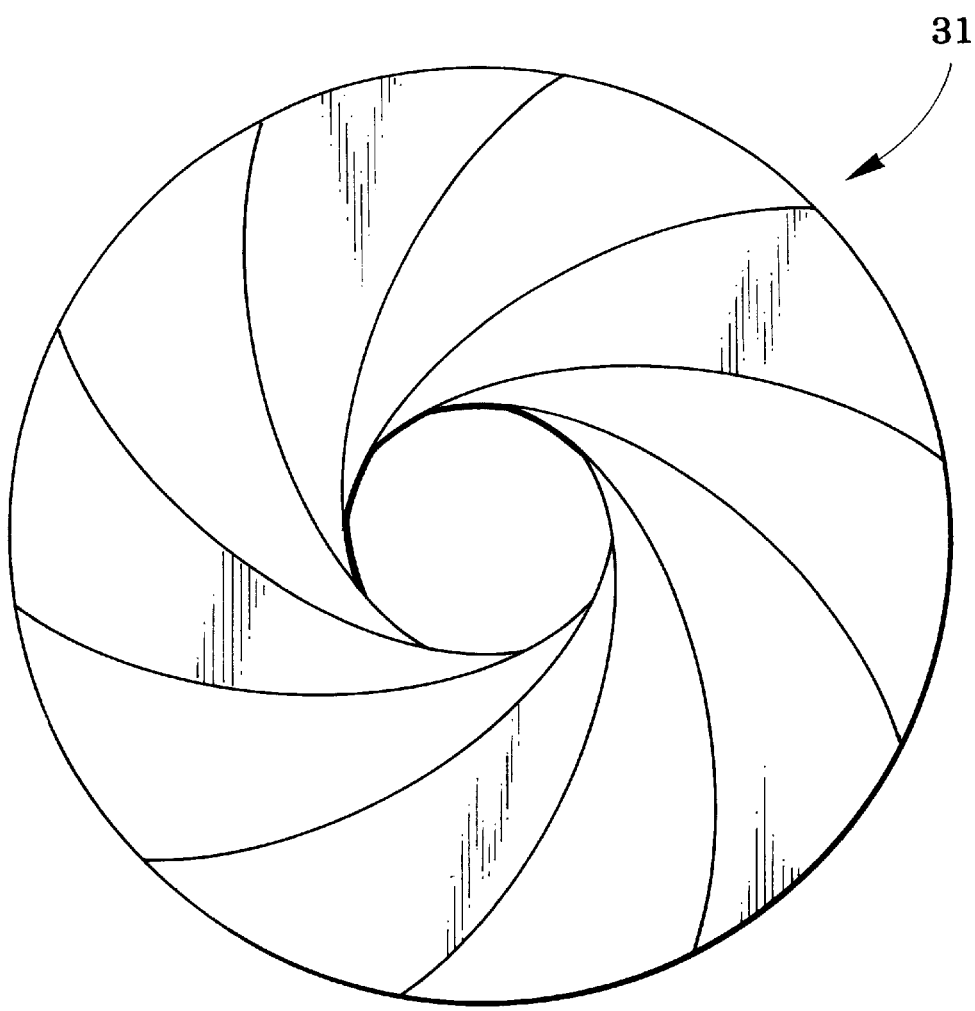
FIG. 7 is a schematic front view showing a still further example of a confocal switching member.

FIG. 7 is a schematic front view showing a still further example of a confocal switching member.

As shown in FIG. 7, in this example, the confocal switching member 31 is constituted by an iris diaphragm whose center is located in the light path. When an image carried in a DNA micro-array is to be read, a pinhole having the smallest diameter is formed in the light path and when an autoradiographic image regarding a locational information and recorded in the stimulable phosphor layer formed on a stimulable phosphor sheet is to be read, a pinhole having an intermediate diameter is formed in the light path. Further, when a fluorescent image carried in a transfer support or a gel support is to be read, a pinhole having the largest diameter is formed in the light path.

The present invention has thus been shown and described with reference to specific embodiments. However, it should be noted that the present invention is in no way limited to the details of the described arrangements but changes and modifications may be made without departing from the scope of the appended claims.

For example, in the above described embodiment was explained with regard to to the reading of a fluorescent image carried in a DNA micro-array prepared by the steps of spotting cDNAs which are specific binding substances, each of which has a known base sequence and is different from the others onto predetermined positions on the surface of the slide glass plate, extracting a specimen of mRNA from biological cells, extracting RNA having poly A at 3' terminal from mRNA, synthesizing cDNA from the thus extracted RNA having poly A at 3' terminal in the presence of a labeling substance Cy-5, preparing probe DNA labeled with Cy-5, preparing a solution of the thus obtained probe DNA labeled with Cy-5, and gently loading the solution onto the surface of the slide glass on which cDNAs, specific binding substances, are spotted, thereby performing hybridization. However, the present invention is in no way limited to the reading of a fluorescent image carried in a DNA micro-array prepared in such a manner but can be widely applied to the reading of fluorescent images carried in the DNA micro-arrays prepared by the steps of using a spotter device to drop at different positions on the surface of a carrier a specific binding substance which can specifically bind with a substance derived from a living body such as hormone, a tumor marker, enzyme, antibody, antigen, abzyme, other proteins, a nuclear acid, cDNA, DNA, RNA and the like and whose sequence, base length, composition and the like are known, thereby forming a number of independent spots, and hybridizing the specific binding substance with a substance derived from a living body such as hormone, a tumor marker, enzyme, antibody, antigen, abzyme, other proteins, a nuclear acid, cDNA, DNA, mRNA, which is gathered from a living body by extraction, isolation or the like or is further subjected to chemical processing, chemical modification or the like and is labeled with a labeling substance such as a fluorescent substance.

Further, in the above described embodiment, the explanation is made as to the photoelectrical reading of an electrophoresed image of gene obtained by a Southern blot-hybridization method and recorded in a transfer support or a gel support in accordance with a fluorescent image detection system, or that recorded in a stimulable phosphor layer formed on a stimulable phosphor sheet in accordance with an autoradiographic image detection system. However, the present invention is not limited to such image reading but can also be applied to various other types of image reading. Specifically, the present invention can also be applied to reading of other images of fluorescent substances recorded in a gel support or a transfer support in accordance with the fluorescent detection system or images for the separation or identification of protein or the estimation of molecular weight or properties of protein or the like, autoradiographic images of a protein produced by thin layer chromatography (TLC) and recorded in the stimulable phosphor layer formed on the stimulable phosphor sheet, an autoradiographic image produced by polyacrylamide gel electrophoresis for the separation or identification of protein or the estimation of molecular weight or properties of protein or the like and recorded in the stimulable phosphor layer formed on the stimulable phosphor sheet, and an autoradiographic image recorded in the stimulable phosphor layer formed on the stimulable phosphor sheet for studying the metabolism, absorption, excretion path and state of a substance introduced into a test mouse. Further, the present invention is applicable to reading of an electron beam transmission image or an electron beam diffraction image of a metal or nonmetal produced by an electron microscope and an electron microscope image of tissue of an organism recorded in the stimulable phosphor layer formed on the stimulable phosphor sheet, and a radiographic diffraction image of a metal or nonmetal recorded in the stimulable phosphor layer formed on the stimulable phosphor sheet.

Moreover, in the above described embodiment, although the image reading apparatus includes the first laser stimulating ray source 1, the second laser stimulating ray source 2 and the third laser stimulating ray source 3, it is not absolutely necessary for the image reading apparatus to include three laser stimulating ray sources and it is sufficient for the image reading apparatus to be able to read a micro-array image and in addition to the micro-array image, at least one kind of image among a fluorescent image carried in a transfer support or a gel support, an autoradiographic image regarding locational information and recorded in the stimulable phosphor layer formed on a stimulable phosphor sheet, an electron beam transmission image and an electron beam diffraction image of a metal or nonmetal specimen and an electron microscope image of the tissue of an organism, a radiographic diffraction image of a metal or nonmetal specimen recorded in the stimulable phosphor layer formed on a stimulable phosphor sheet, and a chemiluminescent image recorded in the stimulable phosphor layer formed on a stimulable phosphor sheet. For example, the second laser stimulating ray source 2 may be omitted or the image reading apparatus may be constituted by providing only the first laser stimulating ray source 1 so as to read a micro-array image and a fluorescent image produced by labeling a specimen with Cy-5 or the like which can be efficiently excited by a laser beam having a wavelength of 640 nm, an autoradiographic image regarding locational information, an electron microscope image and a radiographic diffraction image recorded in the stimulable phosphor layer formed on a stimulable phosphor sheet.

Further, in the above described embodiment, although a semiconductor laser beam source for emitting a laser beam 4 having a wavelength of 640 nm is employed as the first laser stimulating ray source 1, a He—Ne laser beam source for emitting a laser beam 4 having a wavelength of 633 nm or a semiconductor laser beam source for emitting a laser beam 4 having a wavelength of 635 nm may be employed instead of the semiconductor laser beam source for emitting a laser beam 4 having a wavelength of 640 nm.

Moreover, in the above described embodiment, a laser beam source for emitting a laser beam 4 having a wavelength of 532 nm is used as the second laser stimulating ray source 2 and a laser beam source for emitting a laser beam 4 having a wavelength of 473 nm is used as the third laser stimulating ray source 3. However, depending upon the kind of a fluorescent substance, a laser beam source for emitting a laser beam 4 having a wavelength of 530 to 540 nm may be used as the second laser stimulating ray source 2 and a laser beam source for emitting a laser beam 4 having a wavelength of 470 to 480 nm may be used as the third laser stimulating ray source 3.

Further, in the above described embodiment, the entire surface of the image carrier 21 is scanned with a laser beam 4 by moving the stage 20 using a scanning mechanism. However, the entire surface of the image carrier 21 may be scanned with a laser beam 4 by moving the optical unit 15 in the X-Y directions in FIG. 1, while holding the stage 20 stationary or by moving the optical unit 15 in the X direction in FIG. 1 and moving the stage 20 in the Y direction.

Furthermore, although the perforated mirror 18 formed with the hole 17 is used in the above described embodiments, the mirror can be formed with a coating capable of transmitting the laser beam 4 instead of the hole 17.

Moreover, the photomultiplier 33 is employed as a light detector to photoelectrically detect fluorescent light or stimulated emission released from the image carrier 21 in the above described embodiments. However, it is sufficient for the light detector used in the present invention to be able to photoelectrically detect fluorescent light or stimulated emission and it is possible to employ a light detector such as a CCD instead of the photomultiplier 33.

According to the present invention, it is possible to provide an image reading apparatus which can be used for not only a micro-array image detecting system but also an autoradiographic image detecting system, a chemiluminescent image detecting system, an image detecting system using an electron microscope and a radiographic diffraction image detecting system using a stimulable phosphor sheet and a fluorescent image detecting system.

What is claimed is:

1. An image reading apparatus comprising at least one laser stimulating ray source, a stage on which two or more kinds of image camers can selectively be placed, a scanning mechanism for scanning the image carrier with a laser beam emitted from the at least one laser stimulating ray source, thereby stimulating the image carrier, a light detector for photoelectrically detecting light emitted from the image carrier in response to stimulation by the laser beam and a confocal optical system for leading light emitted from the image carrier to the detector, the image reading apparatus further comprising a confocal switching means having diameter-variable pinhole means and disposed between the confocal optical system and the light detector and whose pinhole diameter is variable, based on the kinds of image carriers.

2. An image reading apparatus in accordance with claim 1 wherein the confocal switching means is constituted by an iris diaphragm whose center portion is located in a path of light emitted from the image carrier and the image reading apparatus further comprises a drive means for adjusting a diameter of the iris diaphragm.

3. An image reading apparatus in accordance with claim 2 which further comprises a holder sensor for detecting the kind of a holder supporting the image carrier placed on the stage and a confocal switching control means for controlling the drive means in accordance with a detection signal of the holder sensor.

4. An image reading apparatus in accordance with claim 3 wherein the two or more kinds of image carriers include at least a DNA micro-array.

5. An image reading apparatus in accordance with claim 2 wherein the two or more kinds of image carriers include at least a DNA micro-array.

6. An image reading apparatus in accordance with claim 5 wherein the two or more kinds of image carriers include at least one kind of image carrier selected from a group consisting of a support carrying an image of a fluorescent substance produced by a fluorescent image detecting system, a stimulable phosphor sheet carrying an autoradiographic image, a stimulable phosphor sheet carrying an image of an electron microscope, a stimulable phosphor sheet carrying a radiographic diffraction image, and a stimulable phosphor sheet carrying a chemiluminescent image.

7. An image reading apparatus in accordance with claim 1 wherein the two or more kinds of image carriers include at least a DNA micro-array.

8. An image reading apparatus in accordance with claim 7 wherein the two or more kinds of image carriers include at least one kind of image carrier selected from a group consisting of a support carrying an image of a fluorescent substance produced by a fluorescent image detecting system, a stimulable phosphor sheet carrying an autoradiographic image, a stimulable phosphor sheet carrying an image of an electron microscope, a stimulable phosphor sheet carrying a radiographic diffraction image, and a stimulable phosphor sheet carrying a chemiluminescent image.

9. An image reading apparatus comprising at least one laser stimulating ray source, a stage on which two or more kinds of image carriers can selectively be placed, a scanning mechanism for scanning the image carrier with a laser beam emitted from the at least one laser stimulating ray source, thereby stimulating the image carrier, a light detector for photoelectrically detecting light emitted from the image carrier in response to stimulation by the laser beam and a confocal optical system for leading light emitted from the image carrier to the light detector, the image reading apparatus further comprising a confocal switching means having diameter-variable pinhole means and disposed between the confocal optical system and the light detector and whose pinhole diameter is variable, wherein the confocal switching means is constituted by a rectangular plate member formed with a plurality of pinholes having different diameters and the image reading apparatus further comprises drive means for sliding the confocal switching means so that the respective pinholes can be selectively located in a path of light emitted from the image carrier.

10. An image reading apparatus in accordance with claim 9 which further comprises a holder sensor for detecting the kind of a holder supporting the image carrier placed on the stage and a confocal switching control means for controlling the drive means in accordance with a detection signal of the holder sensor.

11. An image reading apparatus in accordance with claim 10 wherein the two or more kinds of image carriers include at least a DNA micro-array.

12. An image reading apparatus in accordance with claim 9 wherein the two or more kinds of image carriers include at least a DNA micro-array.

13. An image reading apparatus in accordance with claim 12 wherein the two or more kinds of image carriers include at least one kind of image carrier selected from a group consisting of a support carrying an image of a fluorescent substance produced by a fluorescent image detecting system, a stimulable phosphor sheet carrying an autoradiographic image, a stimulable phosphor sheet carrying an image of an electron microscope, a stimulable phosphor sheet carrying a radiographic diffraction image, and a stimulable phosphor sheet carrying a chemiluminescent image.

14. An image reading apparatus comprising at least one laser stimulating ray source, a stage on which two or more kinds of image carriers can selectively be placed, a scanning mechanism for scanning the image carrier with a laser beam emitted from the at least one laser stimulating ray source, thereby stimulating the image carrier, a light detector for photoelectrically detecting light emitted from the image carrier in response to stimulation by the laser beam and a confocal optical system for leading light emitted from the image carrier to the light detector, the image reading apparatus further comprising a confocal switching means having diameter-variable pinhole means and disposed between the confocal optical system and the light detector and whose pinhole diameter is variable, wherein the confocal switching means is constituted by a circular plate member formed with a plurality of pinholes having different diameters and the image reading apparatus further comprises drive means for rotating the confocal switching means so that the respective pinholes can be selectively located in a path of light emitted from the image carrier.

15. An image reading apparatus in accordance with claim 14 which further comprises a holder sensor for detecting the kind of a holder supporting the image carrier placed on the stage and a confocal switching control means for controlling the drive means in accordance with a detection signal of the holder sensor.

16. An image reading apparatus in accordance with claim 15 wherein the two or more kinds of image carriers include at least a DNA micro-array.

17. An image reading apparatus in accordance with claim 14 wherein the two or more kinds of image carriers include at least a DNA micro-array.

18. An image reading apparatus in accordance with claim 17 wherein the two or more kinds of image carriers include at least one kind of image carrier selected from a group consisting of a support carrying an image of a fluorescent substance produced by a fluorescent image detecting system, a stimulable phosphor sheet carrying an autoradiographic image, a stimulable phosphor sheet carrying an image of an electron microscope, a stimulable phosphor sheet carrying a radiographic diffraction image, and a stimulable phosphor sheet carrying a chemiluminescent image.

19. An image reading apparatus comprising at least one laser stimulating ray source, a stage on which two or more kinds of image carriers can selectively be placed, a scanning mechanism for scanning the image carrier with a laser beam emitted from the at least one laser stimulating ray source, thereby stimulating the image carrier, a light detector for photoelectrically detecting light emitted from the image carrier in response to stimulation by the laser beam and a confocal optical system for leading light emitted from the image carrier to the light detector, the image reading apparatus further comprising a confocal switching means having diameter-variable pinhole means and disposed between the confocal optical system and the light detector and whose pinhole diameter is variable, wherein the confocal switching means is constituted by a plate-like member formed with a single pinhole and the image reading apparatus further comprises a drive means for sliding the confocal switching means between a confocal position where the single pinhole is located in a path of light emitted from the image carrier and a retracted position where the single pinhole is retracted from the path of light emitted from the image carrier.

20. An image reading apparatus in accordance with claim 19, which further comprises a holder sensor for detecting the kind of a holder supporting the image carrier placed on the stage and a confocal switching control means for controlling the drive means in accordance with a detection signal of the holder sensor.

21. An image reading apparatus in accordance with claim 20 wherein the two or more kinds of image carriers include at least a DNA micro-array.

22. An image reading apparatus in accordance with claim 19 wherein the two or more kinds of image carriers include at least a DNA micro-array.

23. An image reading apparatus in accordance with claim 22 wherein the two or more kinds of image carriers include at least one kind of image carrier selected from a group consisting of a support carrying an image of a fluorescent substance produced by a fluorescent image detecting system, a stimulable phosphor sheet carrying an autoradiographic image, a stimulable phosphor sheet carrying an image of an electron microscope, a stimulable phosphor sheet carrying a radiographic diffraction image, and a stimulable phosphor sheet carrying a chemiluminescent image.

24. An image reading apparatus comprising at least one laser stimulating ray source, a stage on which two or more kinds of image carriers can selectively be placed, a scanning mechanism for scanning the image carrier with a laser beam emitted from the at least one laser stimulating ray source, thereby stimulating the image carrier, a light detector for photoelectrically detecting light emitted from the image carrier in response to stimulation by the laser beam and a confocal optical system for leading light emitted from the image carrier to the light detector, the image reading apparatus further comprising a confocal switching means having diameter-variable pinhole means and disposed between the confocal optical system and the light detector and whose pinhole diameter is variable, wherein the two or more kinds of image carriers include image carriers holding a substance to be analyzed on a surface and image carriers suspending the substance to be analyzed at a sub-surface.

25. An image reading apparatus in accordance with claim 24, wherein the pinhole diameter varies based on the kinds of image carriers.

26. An image reading apparatus comprising at least one laser stimulating ray source, a stage on which two or more kinds of image carriers can selectively be placed, a scanning mechanism for scanning the image carrier with a laser beam emitted from the at least one laser stimulating ray source, thereby stimulating the image carrier, a light detector for photoelectrically detecting light emitted from the image carrier in response to stimulation by the laser beam and a confocal optical system for leading light emitted from the image carrier to the light detector, the image reading apparatus further comprising a confocal switching means having diameter-variable pinhole means and disposed between the confocal optical system and the light detector and whose pinhole diameter is variable, a holder sensor for detecting the kind of a holder supporting the image carrier placed on the stage and a confocal switching control means for controlling the drive means in accordance with a detection signal of the holder sensor.

* * * * *